United States Patent
Arase et al.

(10) Patent No.: US 7,250,077 B2
(45) Date of Patent: *Jul. 31, 2007

(54) INK COMPOSITION FOR INKJET RECORDING, INK CARTRIDGE AND RECORDING APPARATUS

(75) Inventors: Hidekazu Arase, Hyogo (JP); Mamoru Soga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/440,699

(22) Filed: May 19, 2003

(65) Prior Publication Data

US 2003/0221586 A1   Dec. 4, 2003

(30) Foreign Application Priority Data

May 29, 2002   (JP) ................. 2002-154903

(51) Int. Cl.
*C09D 11/02*   (2006.01)
*G01D 11/00*   (2006.01)

(52) U.S. Cl. ............ 106/31.27; 106/31.6; 106/31.86; 106/31.58; 106/31.43; 106/31.75; 106/31.49; 106/31.78; 347/100

(58) Field of Classification Search ........... 106/31.27, 106/31.6, 31.58, 31.86, 31.43, 31.75, 31.49, 106/31.78; 347/100
See application file for complete search history.

(56) References Cited

U.S. PATENT DOCUMENTS

| | | | | |
|---|---|---|---|---|
| 5,558,700 A | * | 9/1996 | Shibahashi et al. ...... | 106/31.15 |
| 5,743,945 A | * | 4/1998 | Yamashita et al. ....... | 106/31.58 |
| 5,972,082 A | * | 10/1999 | Koyano et al. .......... | 106/31.27 |
| 6,007,610 A | * | 12/1999 | Matzinger et al. ....... | 106/14.05 |
| 6,123,758 A | * | 9/2000 | Colt ........................ | 106/31.43 |
| 6,143,807 A | * | 11/2000 | Lin et al. .................... | 523/161 |
| 6,153,001 A | * | 11/2000 | Suzuki et al. ............. | 106/31.65 |
| 6,264,730 B1 | | 7/2001 | Matsumura et al. ..... | 106/31.43 |
| 6,419,732 B1 | * | 7/2002 | Matsumura et al. ..... | 106/31.75 |
| 6,676,735 B2 | * | 1/2004 | Oki et al. ................. | 106/31.46 |
| 2003/0137570 A1 | * | 7/2003 | Smith et al. ................ | 347/100 |
| 2003/0197769 A1 | * | 10/2003 | Soga et al. ................. | 347/100 |
| 2003/0213403 A1 | * | 11/2003 | Soga et al. ............... | 106/31.27 |

FOREIGN PATENT DOCUMENTS

| | | |
|---|---|---|
| JP | 10-212439 | 8/1998 |
| JP | 11-293167 | 10/1999 |
| JP | 11-315231 | 11/1999 |
| JP | 2000-178494 | 6/2000 |
| JP | 2002-265829 | 9/2002 |
| JP | 2002-275397 | 9/2002 |
| JP | 2003-026976 | 1/2003 |

* cited by examiner

*Primary Examiner*—J. A. Lorengo
*Assistant Examiner*—Veronica Faison-Gee
(74) *Attorney, Agent, or Firm*—Harness, Dickey & Pierce, P.L.C.

(57) ABSTRACT

An aggregation stabilizer is further added to an ink composition for inkjet recording which contains a colorant, a humectant, water, and a water-soluble substance that is condensation-polymerized in the absence of the water. With this aggregation stabilizer, a hardly-soluble or insoluble component formed by the colorant and the water-soluble substance is modified so as to be readily dissolved in water, whereby generation of an aggregate in the ink is prevented.

18 Claims, 4 Drawing Sheets

INK COMPOSITION FOR INKJET RECORDING, INK CARTRIDGE AND RECORDING APPARATUS

BACKGROUND OF THE INVENTION

1. Field of the Invention

The present invention falls within the technical field that relates to an ink composition for inkjet recording, an ink cartridge and a recording apparatus which are suitable for inkjet recording.

2. Description of the Prior Art

Conventionally, ink containing a colorant (dye or pigment), a humectant and water has been well known as ink used for inkjet recording. However, in the case of forming an image with the ink on a recording medium, the water-resistivity of the image is a matter of concern, i.e., there is a problem such that the colorant exudes into water when the image is exposed to water. Especially when an image is recorded on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

In Japanese Unexamined Patent Publication No. 10-212439, Japanese Unexamined Patent Publication No. 11-293167, Japanese Unexamined Patent Publication No. 11-315231, and Japanese Unexamined Patent Publication No. 2000-178494, adding a hydrolyzable silane compound (organic silicon compound) to ink in order to improve the water-resistivity of an image formed with the ink on a recording medium has been proposed. When a drop of such ink containing a silane compound is adhered on a recording medium, and a water content (solvent) of the ink drop evaporates or permeates into the recording medium, the silane compound remaining on the recording medium is condensation-polymerized, and this condensation-polymerized silane compound encloses a colorant. As a result, even when the image formed on the recording medium is exposed to water, the colorant is prevented from exuding into the water.

However, it was found that if such water-resistant ink containing the hydrolyzable silane compound is left in a high temperature environment (e.g., 40° C. or higher) for a long time, an aggregate which is hardly soluble or insoluble in water is generated. It is estimated that this problem is caused by the following reason. In the ink, the strength of an interaction between the colorant and the silane compound gradually increases so that the colorant encloses the silane compound to form an aggregate. The generation of the aggregate causes an ejection failure when the ink is ejected from a nozzle of an inkjet head.

SUMMARY OF THE INVENTION

The present invention was conceived in view of the above circumstances. An objective of the present invention is to improve the storage stability of ink for inkjet recording which contains a water-soluble substance that is condensation-polymerized in the absence of water.

An ink composition of the present invention is an ink composition used for inkjet recording which includes a colorant, a humectant, water, and a water-soluble substance that is condensation-polymerized in the absence of the water. This ink composition further includes an aggregation stabilizer.

The "aggregation stabilizer" includes an agent that modifies a component which is hardly soluble or insoluble in water so as to be readily dissolved in water. In view of its function, the aggregation stabilizer can be called "dissolution stabilizer".

According to the above structure of the present invention, the ink composition contains the aggregation stabilizer. The aggregation stabilizer modifies a component hardly soluble or insoluble in water, which can be generated in the ink because of an interaction between a colorant and a water-soluble substance, so as to be readily dissolved in water. Thus, even when the ink composition is left in a high-temperature environment for a long time, generation of an aggregate in the ink composition is prevented.

When such an ink composition is adhered onto a recording medium in the form of an ink drop, the water content (including the aggregation stabilizer) evaporates or permeates into the recording medium, whereby the water-soluble substance is condensation-polymerized. As a result, a product of the condensation-polymerization encloses the colorant. Accordingly, even when an image formed with the ink drop on the recording medium is exposed to water, the colorant is prevented from exuding into the water, and the water-resistivity of the image is secured.

The aggregation stabilizer may be, for example, a group of water-soluble organic compounds which are aggregated to form a micelle structure around a hardly-soluble or insoluble component formed by a water-soluble substance that encloses a colorant. In this case, the micelle structure has a hydrophobic part inside (i.e., at the side of the hardly-soluble or insoluble component) and a hydrophilic part outside (i.e., at the side of water phase).

Specific examples of such an aggregation stabilizer include polyhydric alcohol monoalkylether and polyhydric alcohol dialkylether. Further, water-soluble monohydric alcohol and water-soluble dihydric alcohol may also be used as the aggregation stabilizer. Alternatively, the aggregation stabilizer may be a pyrrolidone compound.

Still alternatively, the aggregation stabilizer may be an alkanolamine or may be urea. In the case where any of these substances is contained in ink, generation of an aggregate in the ink can be prevented.

Preferably, the water-soluble substance is hydrolyzable silane or a partial hydrolyzate thereof. The hydrolyzable silane or the partial hydrolyzate thereof is very preferable because it improves the water-resistivity of the ink.

An ink cartridge of the present invention is an ink cartridge which comprises an ink composition for inkjet recording. The ink composition contains a colorant, a humectant, water, a water-soluble substance that is condensation-polymerized in the absence of the water, and an aggregation stabilizer.

A recording apparatus of the present invention is a recording apparatus which comprises an ink composition for inkjet recording and which ejects the ink composition toward a recording medium. The ink composition contains a colorant, a humectant, water, a water-soluble substance that is condensation-polymerized in the absence of the water, and an aggregation stabilizer.

DESCRIPTION OF THE PREFERRED EMBODIMENTS

Structure of Recording Apparatus

Figure 1:
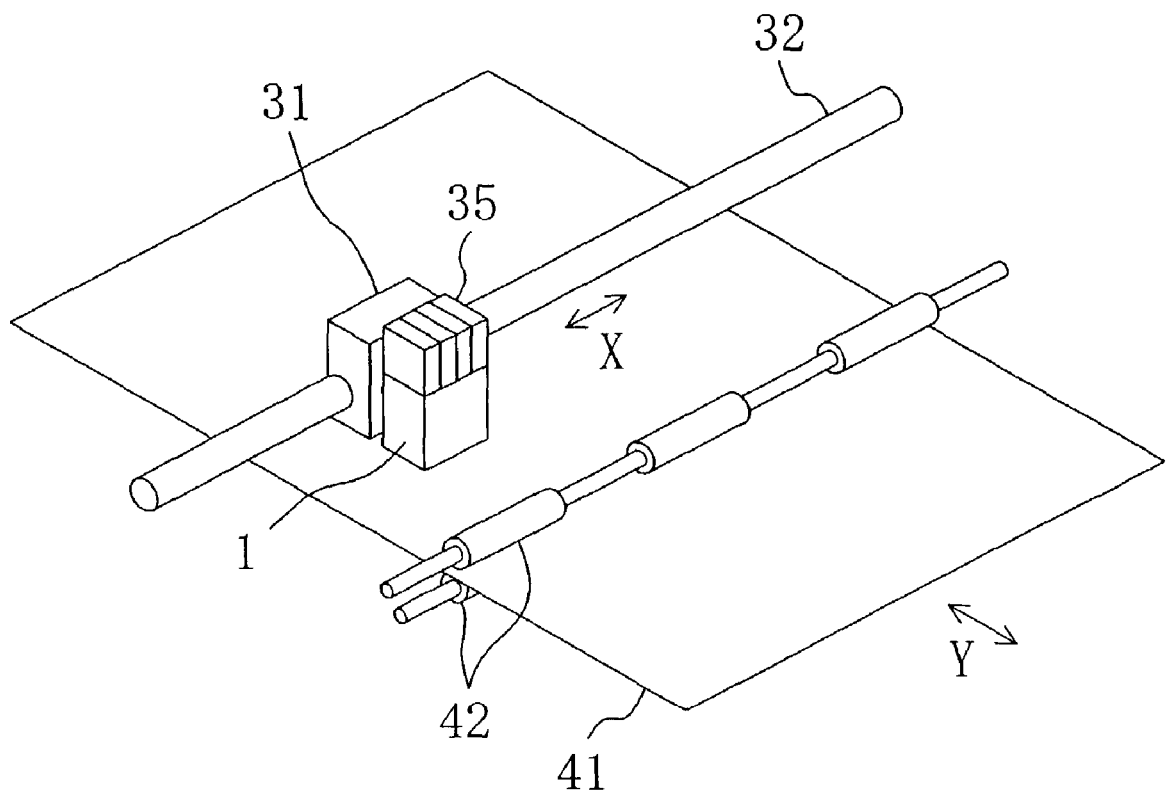
FIG. 1 is a general perspective view showing an inkjet-type recording apparatus including ink for inkjet recording according to an embodiment of the present invention.

FIG. 1 generally shows an inkjet-type recording apparatus A including an ink composition for inkjet recording according to an embodiment of the present invention. The recording apparatus A has an inkjet head 1. The inkjet head 1 ejects the ink onto recording paper 41 in a manner described later. On the upper surface of the inkjet head 1, an ink cartridge 35 including the ink is attached.

The inkjet head 1 is fixedly supported by a carriage 31. The carriage 31 is provided with a carriage motor (not shown). The inkjet head 1 and the carriage 31 are reciprocated by the carriage motor along a major scanning direction (X direction in FIGS. 1 and 2) while being guided by a carriage shaft 32 that extends along the major scanning direction.

The recording paper 41 is sandwiched by two transfer rollers 42 which are rotated by a transfer motor (not shown). Under the inkjet head 1, the recording paper 41 is transferred by the transfer motor and transfer rollers 42 along the minor scanning direction which is perpendicular to the major scanning direction (Y direction in FIGS. 1 and 2).

As described above, the recording apparatus A is structured such that the inkjet head 1 and the recording paper 41 are relatively moved with respect to each other by the carriage 31, the carriage shaft 32 and the carriage motor, and the transfer rollers 42 and the transfer motor.

Figure 2:
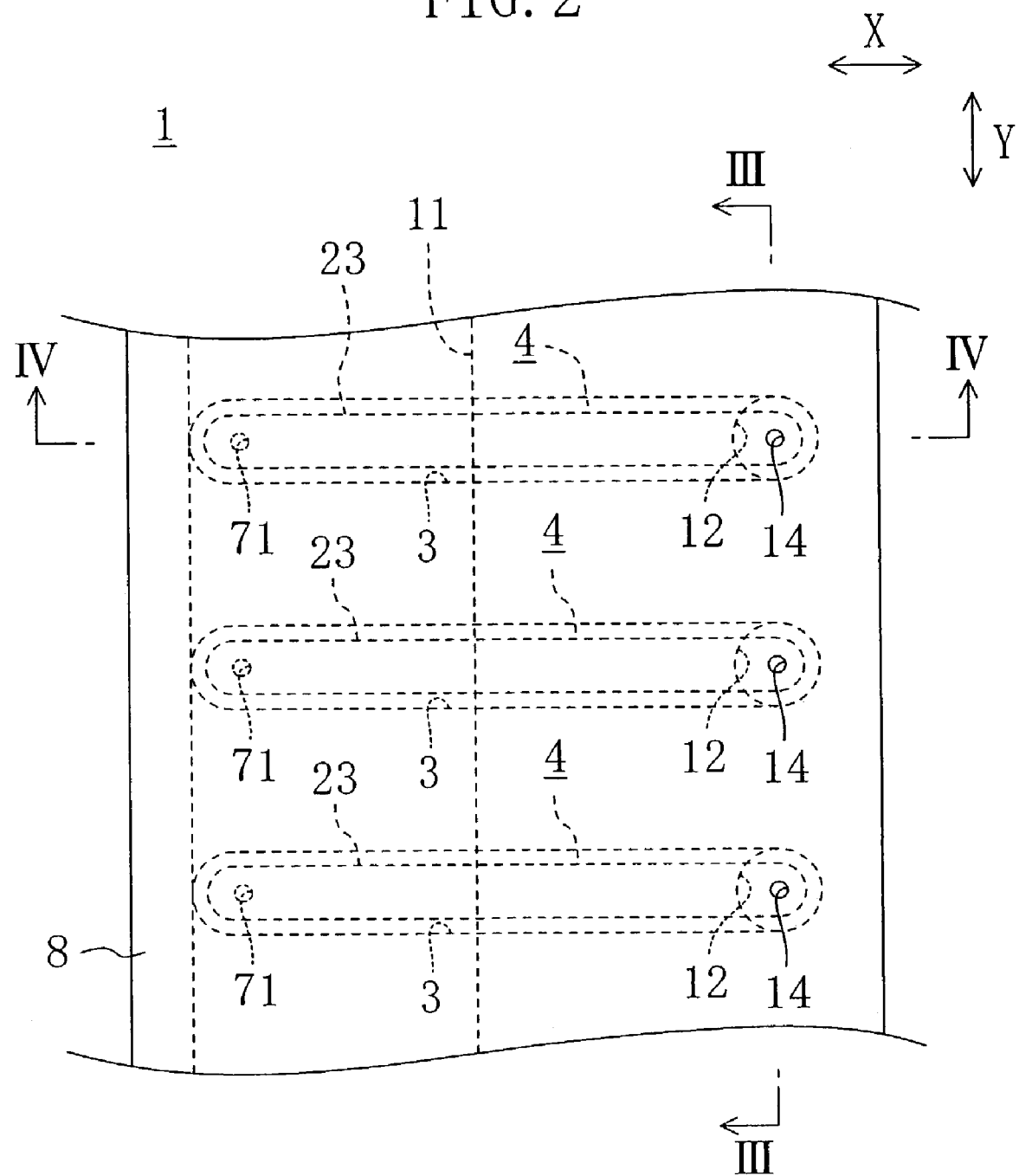
FIG. 2 shows a portion of a bottom surface of an inkjet head of the inkjet-type recording apparatus.
Figure 3:
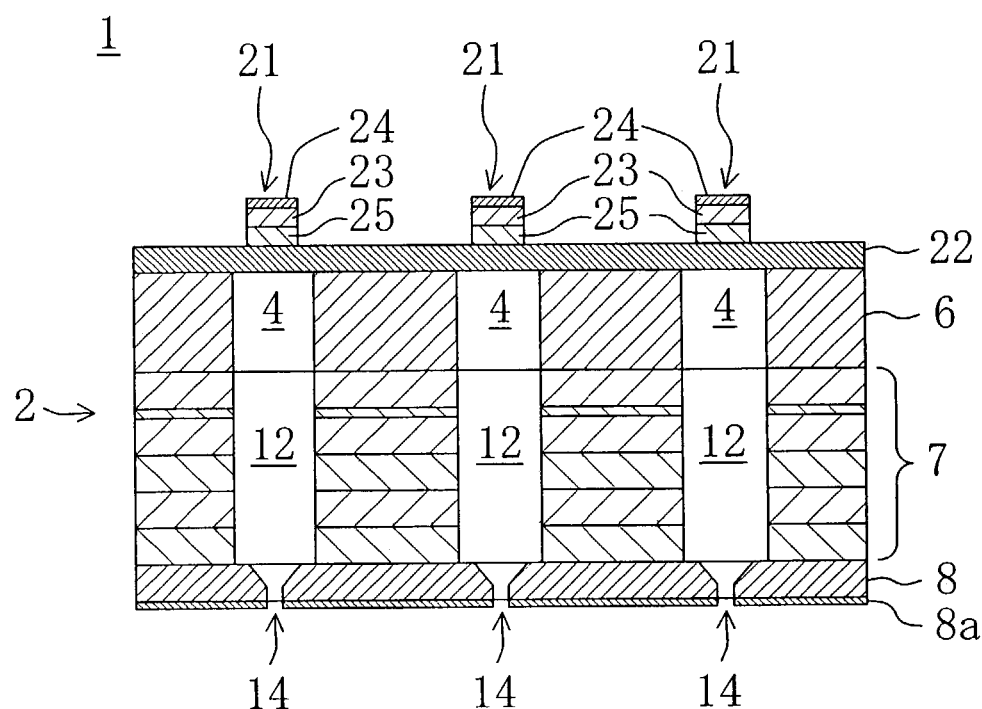
FIG. 3 is a cross-sectional view taken along line III—III of FIG. 2.
Figure 4:
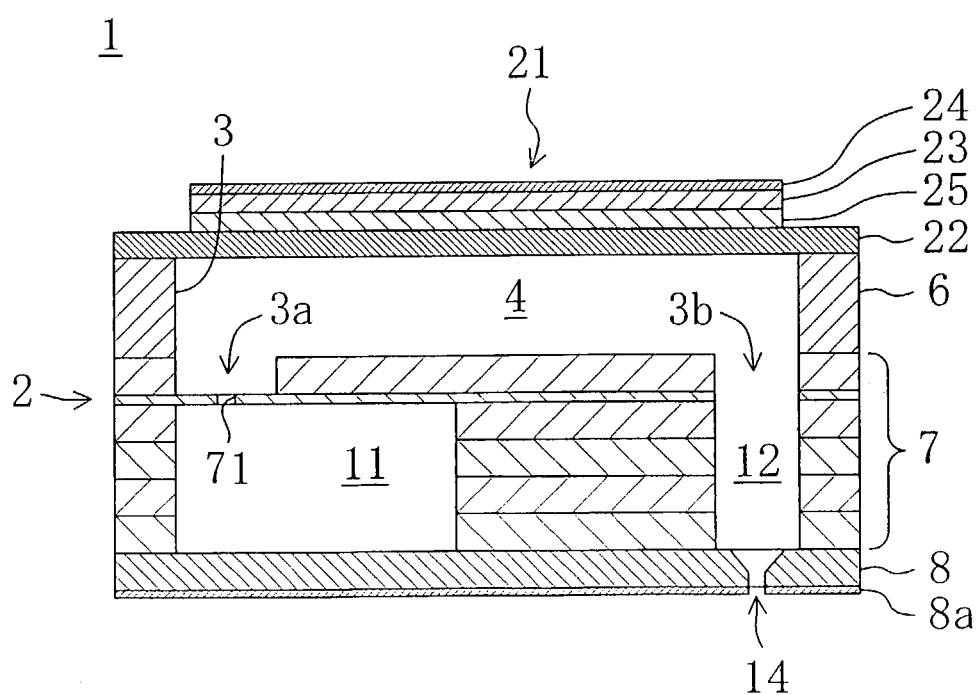
FIG. 4 is a cross-sectional view taken along line IV—IV of FIG. 2.

Referring to FIGS. 2 through 4, the inkjet head 1 includes a head main body 2. The head main body 2 has a plurality of concaved portions 3 for pressure rooms. Each of the concaved portions 3 of the head main body 2 has a supply hole 3a for supplying ink and an ejection hole 3b for ejecting the ink. The concaved portions 3 are opened in the upper surface of the head main body 2 such that the openings extend along the major scanning direction, and arranged along the minor scanning direction with generally-equal intervals therebetween. The length of the opening of each concaved portion 3 is set to about 1250 μm, and the width thereof is set to about 130 μm. Opposite ends of the opening of each concaved portion 3 have a generally-semicircular shape.

A side wall of each concaved portion 3 is formed by a pressure room member 6 made of photosensitive glass having a thickness of about 200 μm. A bottom wall of each concaved portion 3 is formed by an ink passage member 7 which is adhesively fixed onto the lower surface of the pressure room member 6. The ink passage member 7 is a laminate of six thin plates of stainless steel. The ink passage member 7 has a plurality of orifices 71, one ink supply passage 11, and a plurality of ink ejection passages 12. Each of the orifices 71 is connected to the supply hole 3a of a corresponding one of the concaved portions 3. The ink supply passage 11 extends along the minor scanning direction and is connected to the orifices 71. Each of the ink ejection passages 12 is connected to the ejection hole 3b of a corresponding one of the concaved portions 3.

Each orifice 71 is formed in the thin stainless steel plate which is the second from the top of the ink passage member 7, and whose thickness is smaller than the others. The diameter of the orifice 71 is set to about 38 μm. The ink supply passage 11 is connected to the ink cartridge 35, such that the ink is supplied from the ink cartridge 35 into the ink supply passage 11.

A nozzle plate 8 made of stainless steel is adhesively fixed onto the lower surface of the ink passage member 7. The nozzle plate 8 has a plurality of nozzles 14 for ejecting ink drops toward the recording paper 41. The lower surface of the nozzle plate 8 is covered with a water-repulsive film 8a. The nozzles 14 are aligned in a row on the lower surface of the inkjet head 1 along the minor scanning direction. The nozzles 14 are connected to the ink ejection passages 12 so as to have a communication with the ejection holes 3b of the concaved portions 3 through the ink ejection passages 12. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 μm.

Piezoelectric actuators 21 are provided above the concaved portions 3 of the head main body 2. Each of the piezoelectric actuators 21 has a diaphragm 22 made of Cr. The diaphragm 22 is adhesively fixed onto the upper surface of the head main body 2 so as to cover the concaved portions 3 of the head main body 2, such that the diaphragm 22 and the concaved portions 3 form pressure rooms 4. The diaphragm 22 is made of a single plate which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure room 4 (i.e., the upper surface of the diaphragm 22), an intermediate layer 25 made of Cu is provided at a portion of the surface which corresponds to the pressure room 4 (a portion above the opening of the concaved portion 3), and the piezoelectric element 23 is provided on the intermediate layer 25. The individual electrode 24 is bonded onto a surface of the piezoelectric element 23 which is opposite to the diaphragm 22 (i.e., the upper surface of the piezoelectric element 23). Each individual electrode 24 functions together with the diaphragm 22 to apply a voltage (driving voltage) to a corresponding one of the piezoelectric elements 23.

All of the diaphragm 22, the piezoelectric elements 23, the individual electrodes 24 and the intermediate layers 25 are formed of thin films. The thickness of the diaphragm 22 is set to about 6 μm. The thickness of each piezoelectric element 23 is set to 8 μm or smaller (e.g., about 3 μm). The thickness of each individual electrode 24 is set to about 0.2 μm. The thickness of each intermediate layer 25 is set to about 3 μm.

Each piezoelectric actuator 21 applies a driving voltage to the piezoelectric element 23 through the diaphragm 22 and the individual electrode 24, thereby deforming a portion of the diaphragm 22 which corresponds to the pressure room 4 (a portion of the diaphragm 22 at the opening of the concaved portion 3). As a result of the deformation of the diaphragm 22, the ink in the pressure room 4 is ejected from the nozzle 14 through the ejection hole 3b. That is, when a pulse-shaped voltage is applied between the diaphragm 22 and the individual electrode 24, the piezoelectric element 23 shrinks in the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink even when the pulse voltage is applied. As a result, a portion of the diaphragm 22 which corresponds to the pressure room 4 is flexibly deformed into the shape of a convex toward the pressure room 4 because of a so-called bimetal effect. This flexible deformation increases the pressure inside the pressure room 4, and because of this increased pressure, the ink in the pressure room 4 is squeezed out of the nozzle 14 through the ejection hole 3$b$ and the ink ejection passages 12. Then, the piezoelectric element 23 expands in response to a falling edge of the pulse voltage so that the portion of the diaphragm 22 which corresponds to the pressure room 4 recovers its original shape. At this time, the ink squeezed out of the nozzle 14 is separated from the ink remaining in the ink ejection passage 12, whereby the separated ink is released as an ink drop (e.g., 3 pl) toward the recording paper 41. The released ink drop adheres onto the recording paper 41 in the form of a dot. On the other hand, when the diaphragm 22 flexibly deformed in the shape of a convex recovers its original shape, the pressure room 4 is charged with ink supplied from the ink cartridge 35 through the ink supply passage 11 and the supply hole 3$a$. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 μm: driving frequency=20 kHz) while the inkjet head 1 and the carriage 31 are moved from one edge to the other edge of the recording paper 41 at a generally uniform speed along the major scanning direction. It should be noted, however, that the voltage is not applied when the inkjet head 1 resides above a portion of the recording paper 41 where an ink drop is not to be placed. In this way, an ink drop is placed at a predetermined position. After recording of one scanning cycle completes, the recording paper 41 is transferred by a predetermined distance along the minor scanning direction by the transfer motor and the transfer rollers 42. Then, ink drops are ejected again while the inkjet head 1 and the carriage 31 are moved along the major scanning direction, whereby recording of another one scanning cycle is performed. This operation is repeated until a desired image is formed over the recording paper 41.

Ink Composition

An ink composition used in the recording apparatus A contains a colorant (dye or pigment), a humectant for suppressing drying of the ink in the nozzle 14 of the inkjet head 1, or the like, water, and hydrolyzable silane or a partial hydrolyzate thereof (organic silicon compound) employed as a water-soluble substance that is condensation-polymerized in the absence of the water.

The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer.

Preferable color pigments include a pigment treated with a surface active agent, such as a formalin condensation product of naphthalene.sulfonate, lignin sulfonic acid, dioctylsulfosuccinate, polyoxyethylene alkylamine, aliphatic acid ester, or the like. Specifically, examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as glycerol, 1,3-butanediol, or the like, or a water-soluble nitrogen heterocyclic compound, such as 2-pyrrolidone or N-methyl-2-pyrrolidone.

When an ink drop ejected from the nozzle 14 of the inkjet head 1 is adhered onto the recording paper 41, the water content (solvent) of the ink drop evaporates or permeates into the recording paper 41, whereby the organic silicon compound is condensation-polymerized on the recording paper 41 so as to enclose the colorant. Because of this mechanism, even when an image formed with this ink on the recording paper 41 is exposed to water, the colorant is prevented from exuding into the water. As a result, the water-resistivity of the image is improved.

A preferable organic silicon compound is a reaction product of hydrolysis of alkoxysilane containing an organic group that has an amino group and alkoxysilane not containing an amino group. Another preferable organic silicon compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

An ink composition of this embodiment further contains an aggregation stabilizer. The aggregation stabilizer has an function of modifying a hardly-soluble or insoluble component to be readily dissolved in water.

The aggregation stabilizer may be selected from a group consisting of polyhydric alcohol monoalkylethers, polyhydric alcohol dialkylethers, alcohols, pyrrolidones, diols, alkanolamines, and urea.

Among the above candidates, specific examples of the polyhydric alcohol monoalkylethers are shown below:

diethyleneglycol mono n-butylether; diethyleneglycol monomethylether; diethyleneglycol monoethylether; diethyleneglycol mono n-propylether; diethyleneglycol mono isopropylether; diethyleneglycol mono isobutylether; diethyleneglycol mono t-butylether; ethyleneglycol monomethylether; ethyleneglycol monoethylether; ethyleneglycol mono n-propylether; ethyleneglycol mono isopropylether; ethyleneglycol mono t-butylether; dipropyleneglycol monomethylether; dipropyleneglycol monoethylether; dipropyleneglycol mono n-propylether; dipropyleneglycol mono isopropylether; dipropyleneglycol mono isobutylether; dipropyleneglycol mono t-butylether; dipropyleneglycol mono n-butylether; propyleneglycol monomethylether; propyleneglycol monoethylether; propyleneglycol mono n-propylether; propyleneglycol mono isopropylether; propyleneglycol mono t-butylether; triethyleneglycol mono n-butylether; triethyleneglycol monomethylether; triethyleneglycol monoethylether; triethyleneglycol mono n-propylether; triethyleneglycol mono isopropylether; triethyleneglycol mono isobutylether; triethyleneglycol mono t-butylether.

Specific examples of polyhydric alcohol dialkylethers include ethyleneglycol dimethylether and ethyleneglycol ethylmethylether.

Specific examples of water-soluble monohydric alcohol include ethanol, 1-propanol, 2-propanol, 1-butanol, 2-butanol, isobutylalcohol, t-butylalcohol, and trifluoroethanol.

Specific examples of water-soluble dihydric alcohol include propyleneglycol, dipropyleneglycol, 1,2-butanediol, 1,3-butanediol, 2-methyl-1,3-butanediol, and 2,2'-thiodiethanol.

Specific examples of alkanolamines include monoethanolamine, diethanolamine, and triethanolamine.

Specific examples of pyrrolidone compounds include 2-pyrrolidone and N-methyl-2-pyrrolidone.

The ink composition of this embodiment contains a colorant, a humectant, water, and hydrolyzable silane or a partial hydrolyzate thereof (water-soluble substance that is condensation-polymerized in the absence of water). Thus, when an image is formed using this ink composition on the recording paper 41 with the recording apparatus A, and an ink drop of the ink composition is adhered on the recording paper 41, the solvent which includes the humectant and water permeates into the recording paper 41, whereby the silane compound is condensation-polymerized, and the condensation-polymerized silane compound encloses the colorant. Thus, even when the image on the recording paper 41 is exposed to water, the colorant is prevented from exuding into the water.

Figure 5:
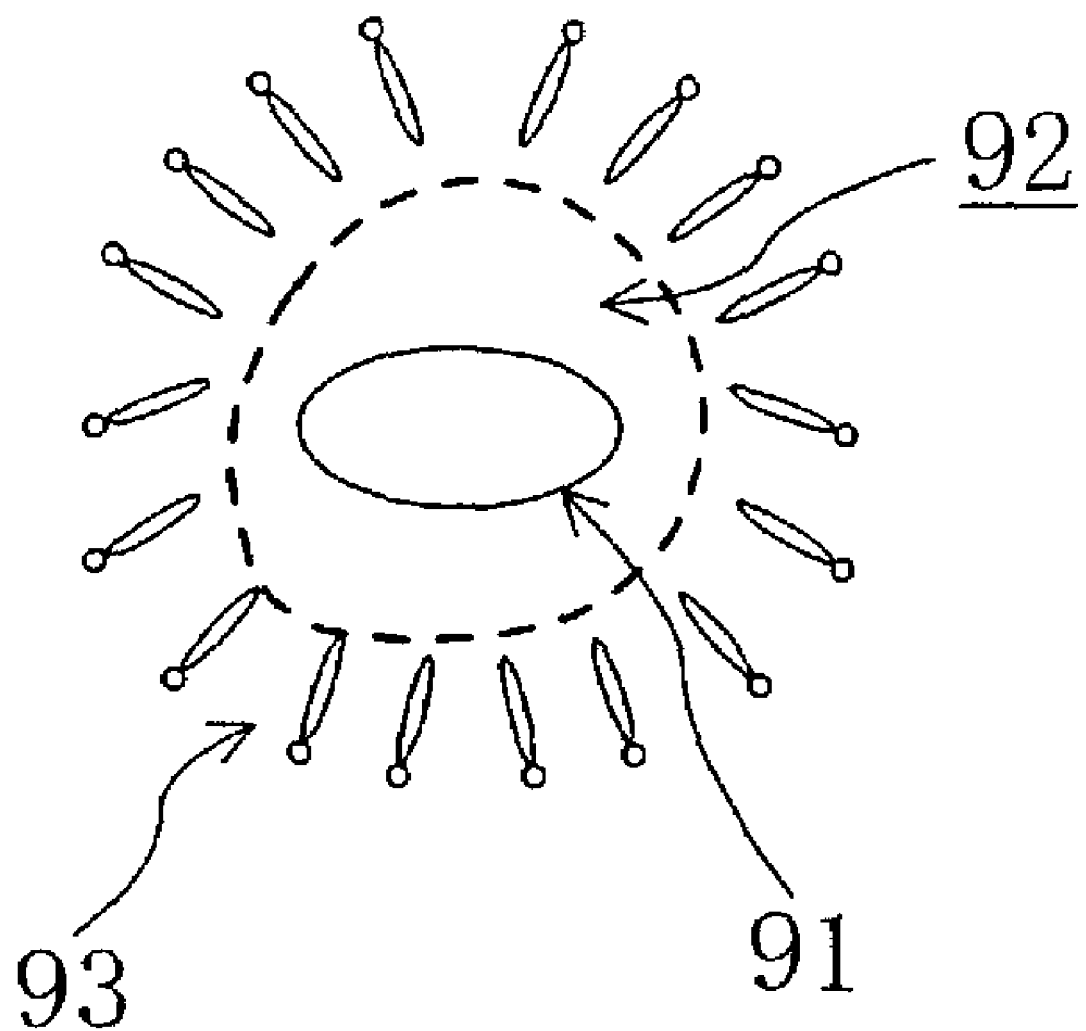
FIG. 5 is a model diagram that illustrates the structure of an aggregation stabilizer in ink.

The ink composition of this embodiment contains an aggregation stabilizer. If the aggregation stabilizer is not contained, when water-soluble ink containing a silane compound is left in a high-temperature environment for a long time, a component which is hardly soluble or insoluble in water is generated in general cases. The aggregation stabilizer modifies the hardly-soluble or insoluble component so as to be readily dissolved in water. As a result, generation of an aggregate in the ink is prevented. That is, an interaction between a colorant 91 and a silane compound 92 in the ink composition 9 becomes gradually stronger, and accordingly, the silane compound 92 encloses the colorant 91 to generate a hardly-soluble or insoluble component as shown in FIG. 5. In the case where the aggregation stabilizer is any of polyhydric alcohol monoalkylethers, polyhydric alcohol dialkylethers, alcohols, pyrrolidones, and diols, the aggregation stabilizer 93 forms a micelle structure around the hardly-soluble or insoluble component in such a manner that the micelle structure has a hydrophobic part inside and a hydrophilic part outside. With this structure, the hardly-soluble or insoluble component is modified to be readily dissolved in water. In this way, generation of an aggregate in the ink composition 9 is prevented. Alternatively, when the aggregation stabilizer is any of alkanolamines and urea, the aggregation stabilizer does not form a micelle structure. However, also in such a case, generation of an aggregate is prevented even if the ink composition is left in a high-temperature environment for a long time, although a mechanism of preventing generation of an aggregate is not specifically elucidated. It is estimated that alkanolamines and urea contribute to stabilization of a silanol group.

For such a reason, the storage stability of the ink composition of this embodiment is improved.

When the aggregation stabilizer is any of alcohols, an aggregation stabilizing effect is sufficiently obtained even when the content of the alcohol is relatively small as described later in specific examples.

The above-described effect achieved by the aggregation stabilizer is also obtained even when two or more different types of compounds which are selected from the above examples of the aggregation stabilizer are concurrently used.

The ink composition of this embodiment contains a hydrolyzable silane compound as a water-soluble substance that is condensation-polymerized in the absence of water, but the water-soluble substance is not limited thereto.

According to the present invention, any type of water-soluble substance may be used so long as the substance is condensation-polymerized to enclose a colorant of ink when an ink drop ejected from the nozzle 14 of the inkjet head 1 is adhered on the recording paper 41, and the water content (solvent) of the ink drop evaporates or permeates into the recording paper 41.

Next, specific examples of this embodiment are described below.

First, 23 types of ink compositions for inkjet recording, which have the compositions shown below, were prepared (Examples 1–23). (It should be noted that the contents of the constituents of each composition are shown in percentage by mass.) The ink compositions of Examples 1–15 contain different types of aggregation stabilizers. The ink compositions of Examples 16–23 contain different amounts of aggregation stabilizers.

All of the ink compositions of Examples 1–23 contain glycerol as a humectant.

All of the ink compositions of Examples 1–23 contain a dye (Acid Black 2) as a colorant.

All of the ink compositions of Examples 1–23 contain organic silicon compound (A) as the water-soluble substance that is condensation-polymerized in the absence of water. The organic silicon compound (A) was prepared by a method described below in accordance with a synthesis method described in Japanese Unexamined Patent Publication No. 10-212439. First, 120 g (6.67 mol) of water was poured into a reactor. A mixture of 0.2 mol of $H_2NCH_2CH_2HNCH_2CH_2CH_2Si(OCH_3)_3$ and 0.1 mol of $Si(OCH_3)_4$ was then added to the water in a drop-by-drop fashion at room temperature. After all of the mixture was dropped into the water, a resultant solution was subjected to a reaction carried out at 60° C. for one hour.

(Example 1)

| | |
|---|---|
| Acid Black 2 | 5% |
| glycerol | 10% |
| organic silicon compound (A) | 5% |
| pure water | 70% |
| diethyleneglycol monobutylether | 10% |

(Example 2)

| | |
|---|---|
| Acid Black 2 | 5% |
| glycerol | 10% |
| organic silicon compound (A) | 5% |
| pure water | 70% |
| triethyleneglycol monobutylether | 10% |

(Example 3)

| | |
|---|---|
| Acid Black 2 | 5% |
| glycerol | 10% |
| organic silicon compound (A) | 5% |
| pure water | 70% |
| ethyleneglycol dimethylether | 10% |

(Example 4)

| | |
|---|---|
| Acid Black 2 | 5% |
| glycerol | 10% |
| organic silicon compound (A) | 5% |
| pure water | 70% |
| 1-propanol | 10% |

(Example 5)

| | |
|---|---|
| Acid Black 2 | 5% |
| glycerol | 10% |
| organic silicon compound (A) | 5% |
| pure water | 70% |
| 2-propanol | 10% |

(Example 6)

| | |
|---|---|
| Acid Black 2 | 5% |
| glycerol | 10% |
| organic silicon compound (A) | 5% |
| pure water | 70% |
| trifluoroethanol | 10% |

(Example 7)

| | |
|---|---|
| Acid Black 2 | 5% |
| glycerol | 10% |
| organic silicon compound (A) | 5% |
| pure water | 70% |
| 2-butoxyethanol | 10% |

(Example 8)

| | |
|---|---|
| Acid Black 2 | 5% |
| glycerol | 10% |
| organic silicon compound (A) | 5% |
| pure water | 70% |
| 2-pyrrolidone | 10% |

(Example 9)

| | |
|---|---|
| Acid Black 2 | 5% |
| glycerol | 10% |
| organic silicon compound (A) | 5% |
| pure water | 70% |
| N-methyl-2-pyrrolidone | 10% |

(Example 10)

| | |
|---|---|
| Acid Black 2 | 5% |
| glycerol | 10% |
| organic silicon compound (A) | 5% |
| pure water | 70% |
| diethanolamine | 10% |

(Example 11)

| | |
|---|---|
| Acid Black 2 | 5% |
| glycerol | 10% |
| organic silicon compound (A) | 5% |
| pure water | 70% |
| triethanolamine | 10% |

(Example 12)

| | |
|---|---|
| Acid Black 2 | 5% |
| glycerol | 10% |
| organic silicon compound (A) | 5% |
| pure water | 70% |
| 1,3-butanediol | 10% |

(Example 13)

| | |
|---|---|
| Acid Black 2 | 5% |
| glycerol | 10% |
| organic silicon compound (A) | 5% |
| pure water | 70% |
| 1,2-butanediol | 10% |

(Example 14)

| | |
|---|---|
| Acid Black 2 | 5% |
| glycerol | 10% |
| organic silicon compound (A) | 5% |
| pure water | 70% |
| 2,2'-thiodiethanol | 10% |

(Example 15)

| | |
|---|---|
| Acid Black 2 | 5% |
| glycerol | 10% |
| organic silicon compound (A) | 5% |
| pure water | 70% |
| urea | 10% |

(Example 16)

| | |
|---|---|
| Acid Black 2 | 5% |
| glycerol | 10% |
| organic silicon compound (A) | 5% |
| pure water | 75% |
| diethyleneglycol monobutylether | 5% |

(Example 17)

| | |
|---|---|
| Acid Black 2 | 5% |
| glycerol | 10% |
| organic silicon compound (A) | 5% |
| pure water | 73% |
| diethyleneglycol monobutylether | 7% |

(Example 18)

| | |
|---|---|
| Acid Black 2 | 5% |
| glycerol | 10% |
| organic silicon compound (A) | 5% |
| pure water | 65% |
| diethyleneglycol monobutylether | 15% |

(Example 19)

| | |
|---|---|
| Acid Black 2 | 5% |
| glycerol | 10% |
| organic silicon compound (A) | 5% |
| pure water | 60% |
| diethyleneglycol monobutylether | 20% |

(Example 20)

| | |
|---|---|
| Acid Black 2 | 5% |
| glycerol | 10% |
| organic silicon compound (A) | 5% |
| pure water | 50% |
| diethyleneglycol monobutylether | 30% |

(Example 21)

| | |
|---|---|
| Acid Black 2 | 5% |
| glycerol | 10% |
| organic silicon compound (A) | 5% |
| pure water | 79% |
| 1-propanol | 1% |

(Example 22)

| | |
|---|---|
| Acid Black 2 | 5% |
| glycerol | 10% |
| organic silicon compound (A) | 5% |
| pure water | 75% |
| 1-propanol | 5% |

(Example 23)

| | |
|---|---|
| Acid Black 2 | 5% |
| glycerol | 10% |
| organic silicon compound (A) | 5% |
| pure water | 50% |
| 1-propanol | 30% |

On the other hand, 3 types of ink having the following compositions were prepared for comparison (Comparative Examples 1–3). (It should be noted that the contents of the constituents of each composition are shown in percentage by mass.)

COMPARATIVE EXAMPLE 1

The ink composition of Comparative Example 1 contains above-described organic silicon compound (A).

| | |
|---|---|
| Acid Black 2 | 5% |
| glycerol | 10% |
| organic silicon compound (A) | 5% |
| pure water | 80% |

COMPARATIVE EXAMPLE 2

Organic silicon compound (B) contained in the ink composition of Comparative Example 2 was produced by the following method in accordance with a synthesis method described in Japanese Unexamined Patent Publication No. 11-293267. First, 120 g (6.67 mol) of water was poured into a reactor. A mixture of 0.2 mol of $(CH_3)_2NCH_2CH_2CH_2Si(OCH_3)_3$ and 0.1 mol of $CH_3Si(OCH_3)_3$ was then added to the water in a drop-by-drop fashion at room temperature. After all of the mixture was dropped into the water, a resultant solution was subjected to a reaction carried out at 60° C. for one hour.

| | |
|---|---|
| Acid Black 2 | 5% |
| glycerol | 10% |
| organic silicon compound (B) | 5% |
| pure water | 80% |

COMPARATIVE EXAMPLE 3

Organic silicon compound (C) contained in the ink composition of Comparative Example 3 was produced by the following method in accordance with a synthesis method described in Japanese Unexamined Patent Publication No. 11-315231. First, 100 g (0.56 mol) of $H_2NCH_2CH_2CH_2Si(OCH_3)_3$ was provided into a reactor. Then, 49 g (0.66 mol) of 2,3-epoxy-1-propanol was added into the reactor in a drop-by-drop fashion. After all of 2,3-epoxy-1-propanol was dropped into the reactor, a resultant mixture in the reactor was stirred at 80° C. for 5 hours, whereby an amino group and an epoxy group were reacted to produce hydrolyzable silane (C-1). Thereafter, a mixture of 120 g (6.67 mol) of water, 50.6 g (0.2 mol) of hydrolyzable silane (C-1), and 15.2 g (0.1 mol) of $Si(OCH_3)_4$ was added into another reactor in a drop-by-drop fashion. After all of the mixture was dropped into the reactor, the mixture was subjected to a reaction at 60° C. for one hour.

| | |
|---|---|
| Acid Black 2 | 5% |
| glycerol | 10% |
| organic silicon compound (C) | 5% |
| pure water | 80% |

The storage stability test was performed on each of the ink compositions of Examples 1–23 and Comparative Examples 1–3. In this storage stability test, each of the ink compositions was poured into a screw vial fully so as to form an airtight system. After the screw vial was left as it is at 70° C. for 500 hours, it was first confirmed by the eye whether or not an aggregate was generated in the ink. If a more specific determination was necessary, the ink composition was subjected to a filter having a pore size of 0.45 micrometers, whereby it was confirmed whether or not an aggregate was generated in the ink. Results of the storage stability test are shown in Table 1. In the column of "Storage stability test" of Table 1, the symbol of "○" indicates that an aggregate was not generated, and the symbol of "x" indicates that an aggregate was generated.

TABLE 1

| | Storage stability test | Water-resistivity | Ejection stability |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Example 10 | ○ | ○ | ○ |
| Example 11 | ○ | ○ | ○ |
| Example 12 | ○ | ○ | ○ |
| Example 13 | ○ | ○ | ○ |
| Example 14 | ○ | ○ | ○ |
| Example 15 | ○ | ○ | ○ |
| Example 16 | ○ | ○ | ○ |
| Example 17 | ○ | ○ | ○ |
| Example 18 | ○ | ○ | ○ |
| Example 19 | ○ | ○ | ○ |
| Example 20 | ○ | ○ | ○ |
| Example 21 | ○ | ○ | ○ |
| Example 22 | ○ | ○ | ○ |
| Example 23 | ○ | ○ | ○ |
| Comparative Example 1 | X | ○ | ○ |
| Comparative Example 2 | X | ○ | ○ |
| Comparative Example 3 | X | ○ | ○ |

In each of the ink compositions of Comparative Examples 1–3, generation of an aggregate was visually confirmed. In each of the ink compositions of Examples 1–23, generation of an aggregate was not confirmed by the eye or by the filter.

The water-resistivity test was then performed on the ink compositions of Examples 1–23 and Comparative Examples 1–3. An image used in this water-resistivity test was formed using each of the above ink compositions on plain paper (product name: "Xerox4024"; produced by Xerox Co.) with a commercially-available printer (which ejects the ink using a piezoelectric actuator similar to that of the above-described recording apparatus (except that the thickness of a piezoelectric element is much greater than that of the above-described recording apparatus)). Immediately after the image was formed, the paper was soaked in pure water and then dried in air at room temperature. Then, it was confirmed whether or not a bleeding was generated in the image on the paper. Results of the confirmation were shown in Table 1. In the column of "Water-resistivity" of Table 1, the symbol of "○" indicates that a bleeding was not generated, and the symbol of "x" indicates that a bleeding was generated.

As shown in Table 1, a bleeding of the image was not generated with any of the ink compositions of Examples 1–23 and Comparative Examples 1–3, i.e., an excellent water-resistivity was obtained for all the ink compositions.

Furthermore, the ejection stability test was performed on the ink compositions of Examples 1–23 and Comparative Examples 1–3. In this ejection stability test, each ink composition was ejected from an inkjet head in the form of an ink drop of a certain amount, and it was confirmed whether or not the ink drop adhered on recording paper had a desired shape and size. Results of the test are shown in Table 1. In the column of "Ejection stability" of Table 1, the symbol of "○" indicates that the ink drop on the recording paper had a desired shape and size, and the symbol of "x" indicates that the ink drop on the recording paper did not have a desired shape and size.

As shown in Table 1, excellent ejection stability was obtained for all of the ink compositions of Examples 1–23 and Comparative Examples 1–3.

Although specific examples are not shown above, it was also confirmed that even when organic silicon compound (A) contained in each of the compositions of Examples 1–23 was replaced by organic silicon compound (B) or organic silicon compound (C), the same storage stability, water-resistivity, and ejection stability which were achieved in Examples 1–23 were still obtained. Furthermore, it was also confirmed that even when the dye (Acid Black 2) contained in each of the ink compositions of Examples 1–23 was replaced by another type of dye or pigment (including a dye or pigment having a different color), the same storage stability, water-resistivity, and ejection stability which were achieved in Examples 1–23 were still obtained.

Thus, in an ink composition of the present invention which contains a colorant, a humectant, water, a water-soluble substance that is condensation-polymerized in the absence of the water, and an aggregation stabilizer, sufficient water-resistivity and ejection stability are, of course, obtained and, in addition, the storage stability can be improved.

What is claimed is:

1. An ink composition used for inkjet recording, comprising: a colorant; a humectant; water; a water-soluble substance that is condensation-polymerized in the absence of the water; wherein said colorant and said water-soluble substance form an insoluble aggregate when the ink composition is exposed to heat, and an aggregation stabilizer that maintains solubility and/or prevents formation of said insoluble aggregate in the ink composition,
wherein the water-soluble substance is hydrolyzable silane or a partial hydrolyzate thereof.

2. An ink composition according to claim 1, wherein the aggregation stabilizer is polyhydric alcohol monoalkylether.

3. An ink composition used for inkjet recording, comprising: a colorant; a humectant; water; a water-soluble substance that is condensation-polymerized in the absence of the water; and an aggregation stabilizer, wherein the aggregation stabilizer is polyhydric alcohol dialkylether.

4. An ink composition according to claim 1, wherein the aggregation stabilizer is water-soluble monohydric alcohol.

5. An ink composition according to claim 1, wherein the aggregation stabilizer is water-soluble dihydric alcohol.

6. An ink composition according to claim 1, wherein the aggregation stabilizer is a pyrrolidone compound.

7. An ink composition according to claim 1, wherein the aggregation stabilizer is an alkanolamine.

8. An ink composition according to claim 1, wherein the aggregation stabilizer is urea.

9. An ink cartridge comprising an ink composition for inkjet recording,
wherein the ink composition includes a colorant; a humectant; water; a water-soluble substance that is condensation-polymerized in the absence of the water; and an aggregation stabilizer, and
the water-soluble substance is hydrolyzable silane or a partial hydrolyzate thereof.

10. A recording apparatus comprising an ink composition for inkjet recording, the recording apparatus ejecting the ink composition toward a recording medium,
wherein the ink composition includes a colorant; a humectant; water; a water-soluble substance that is condensation-polymerized in the absence of the water and an aggregation stabilize, and
the water-soluble substance is hydrolyzable silane or a partial hydrolyzate thereof.

11. An ink composition used for inkjet recording, comprising: a colorant; a humectant; water; a water-soluble substance that is condensation-polymerized in the absence of the water; and an aggregation stabilizer,
wherein the aggregation stabilizer is a group of water-soluble organic compounds which are aggregated to form a micelle structure, and
the water-soluble substance is hydrolyzable silane or a partial hydrolyzate thereof.

12. An ink composition used for inkjet recording, comprising: a colorant; a humectant; water; a water-soluble substance that is condensation-polymerized in the absence of the water; and an aggregation stabilizer selected from the group consisting of: a polyhydric alcohol monoalkylether, a polyhydric alcohol dialkylether, a water-soluble monohydric alcohol, a water-soluble dihydric alcohol, a pyrrolidone compound, an alkanolamine and urea,
wherein the water-soluble substance is hydrolyzable silane or a partial hydrolyzate thereof.

13. A method of stabilizing a water-resistant ink composition comprising including an aggregation stabilizer in the ink composition to maintain solubility and/or to prevent formation of an insoluble aggregate, wherein the ink composition further comprises a colorant, a humectant, water, and a water-soluble substance that undergoes condensation-polymerization in the absence of the water, wherein said colorant and said water-soluble substance form said insoluble aggregate upon exposure to heat, wherein said insoluble aggregate destabilizes the ink composition when said aggregation stabilizer is absent in the ink composition. and wherein said aggregation stabilizer maintains solubility and/or prevents formation of said insoluble aggregate in the ink composition.

14. The method according to claim 13, wherein said aggregation stabilizer has a hydrophobic portion and a hydrophilic portion, wherein said aggregation stabilizer forms a micelle structure around said insoluble aggregate by said hydrophobic portion interacting with said insoluble aggregate and said hydrophilic portion interacting with an aqueous phase of the ink composition, thereby maintaining solubility of the insoluble aggregate in the ink composition.

15. The method according to claim 14, wherein said aggregation stabilizer is selected from the group consisting of: a polyhydric alcohol monoalkylether, a polyhydric alcohol dialkylether, a water-soluble monohydric alcohol, a water-soluble dihydric alcohol, and a pyrrolidone compound.

16. The method according to claim 13, wherein the aggregation stabilizer is present from about 1 to about 30% by weight of the ink composition.

17. The method according to claim 13, wherein the water soluble substance is a hydrolyzable silane and/or a partial hydrolyzate thereof.

18. The method according to claim 13, wherein the ink composition further comprises a humectant that is distinct from said aggregation stabilizer.

* * * * *

UNITED STATES PATENT AND TRADEMARK OFFICE
CERTIFICATE OF CORRECTION

PATENT NO. : 7,250,077 B2  Page 1 of 1
APPLICATION NO. : 10/440699
DATED : July 31, 2007
INVENTOR(S) : Hidekazu Arase et al.

It is certified that error appears in the above-identified patent and that said Letters Patent is hereby corrected as shown below:

Column 13

Line 63, Claim 10, "stabilize" should read -- stabilizer --

Column 14

Line 34, Claim 13, "composition." should read -- composition, --

Signed and Sealed this

Twentieth Day of November, 2007

JON W. DUDAS
*Director of the United States Patent and Trademark Office*